(12) United States Patent
Yang et al.

(10) Patent No.: US 11,308,655 B2
(45) Date of Patent: Apr. 19, 2022

(54) IMAGE SYNTHESIS METHOD AND APPARATUS

(71) Applicant: BEIJING MICROLIVE VISION TECHNOLOGY CO., LTD, Beijing (CN)

(72) Inventors: Hui Yang, Beijing (CN); Shentao Wang, Beijing (CN); Boyuan Hu, Beijing (CN)

(73) Assignee: BEIJING MICROLIVE VISION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/017,226

(22) Filed: Sep. 10, 2020

(65) Prior Publication Data
US 2020/0410723 A1  Dec. 31, 2020

Related U.S. Application Data

(63) Continuation of application No. PCT/CN2018/123647, filed on Dec. 25, 2018.

(30) Foreign Application Priority Data

Aug. 24, 2018 (CN) .......................... 201810974975.2

(51) Int. Cl.
*G06T 11/00* (2006.01)
*G06T 7/73* (2017.01)
(Continued)

(52) U.S. Cl.
CPC .......... *G06T 11/00* (2013.01); *G06K 9/00375* (2013.01); *G06T 7/73* (2017.01);
(Continued)

(58) Field of Classification Search
CPC ........ G06T 19/006; G06T 11/00; G06F 3/011
See application file for complete search history.

(56) References Cited

U.S. PATENT DOCUMENTS 9,165,318 B1   10/2015 Pauley et al.
9,716,842 B1   7/2017 Worley et al.
(Continued)

FOREIGN PATENT DOCUMENTS

CN   103220490 A   7/2013
CN   105334963 A   2/2016
(Continued)

OTHER PUBLICATIONS

International Patent Application No. PCT/CN2018/123647; Int'l Search Report; dated May 16, 2019; 2 pages.

*Primary Examiner* — Yi Yang
(74) *Attorney, Agent, or Firm* — BakerHostetler

(57) ABSTRACT

Disclosed are an image synthesis method and apparatus, and an electronic device and a computer readable storage medium. The image synthesis method comprises: obtaining a virtual object; obtaining a video collected by an image sensor; identifying a hand in the video to obtain hand information; obtaining image rendering information corresponding to the virtual object and the hand information; and synthesizing and rendering the virtual object and the hand according to the image rendering information to generate a synthesized image. By means of the technical solution, the technical problems in the prior art that the virtual object cannot move along with the hand, and the mode that the virtual object is mounted on the hand is not flexible are solved.

15 Claims, 7 Drawing Sheets

(51) Int. Cl.
*G06T 19/00* (2011.01)
*G06K 9/00* (2022.01)

(52) U.S. Cl.
CPC ............... *G06T 2207/10016* (2013.01); *G06T 2207/30196* (2013.01)

(56) References Cited

U.S. PATENT DOCUMENTS

| | | | | |
|---|---|---|---|---|
| 2002/0060648 | A1* | 5/2002 | Matsui | G06F 3/0304 345/8 |
| 2004/0183926 | A1* | 9/2004 | Fukuda | H04N 5/265 348/239 |
| 2006/0080175 | A1* | 4/2006 | Rowe | G07F 17/32 705/14.12 |
| 2013/0100008 | A1* | 4/2013 | Marti | G06F 3/016 345/156 |
| 2014/0068526 | A1 | 3/2014 | Figelman | |
| 2015/0193985 | A1* | 7/2015 | Takemoto | G06T 19/006 345/633 |
| 2015/0358614 | A1* | 12/2015 | Jin | H04N 13/339 348/49 |
| 2016/0014346 | A1* | 1/2016 | Kobayashi | H04N 7/181 348/159 |
| 2016/0180574 | A1 | 6/2016 | Kaminitz et al. | |
| 2018/0158222 | A1 | 6/2018 | Hayashi | |

FOREIGN PATENT DOCUMENTS

| | | |
|---|---|---|
| CN | 105657294 A | 6/2016 |
| CN | 105989618 A | 10/2016 |
| CN | 106156020 A | 11/2016 |
| CN | 106385591 A | 2/2017 |
| CN | 106415647 A | 2/2017 |
| CN | 106713840 A | 5/2017 |
| CN | 107168780 A | 9/2017 |
| CN | 107343211 A | 11/2017 |
| CN | 107563834 A | 1/2018 |
| CN | 107644214 A | 1/2018 |
| CN | 107886387 A | 4/2018 |
| JP | 2002-157606 A | 5/2002 |
| JP | 2010-257359 A | 11/2010 |
| JP | 2012-181748 A | 9/2012 |
| JP | 2014-068689 A | 4/2014 |
| WO | WO 2018/033137 A1 | 2/2018 |
| WO | WO 2018/072652 A1 | 4/2018 |

* cited by examiner

IMAGE SYNTHESIS METHOD AND APPARATUS

The present application is a continuation of International Patent Application No. PCT/CN2018/123647, filed on Dec. 25, 2018, which claims priority to Chinese Patent Application No. 201810974975.2, titled "IMAGE SYNTHESIS METHOD AND APPARATUS", filed on Aug. 24, 2018 with the Chinese Patent Office, both of which are incorporated herein by reference in their entireties.

FIELD

The present disclosure relates to the field of image processing, and in particular to an image synthesis method, an image synthesis apparatus, electronic equipment and computer readable storage medium.

BACKGROUND

With the development of the computer technology, intelligent terminals are widely applied. For example, a user may listen to music, play games, chat on the Internet and take photographs through an intelligent terminal. The intelligent terminal may take a photograph with a resolution of ten millions of pixels, having a high definition which can be comparable to that of a photograph taken by a professional camera.

At present, when taking a photograph using the intelligent terminal, a factory photographing software may be used to achieve a conventional photographic effect. Alternatively, an application (APP) downloaded from the network side may be used to achieve an additional photographic effect. For example, functions such as dim light detection, beauty camera and super pixel may be achieved by using the APP downloaded from the network side. Beauty functions of the intelligent terminal generally include a skin color adjustment function, a dermabrasion function, an eye enlarging function and a face thinning function, each of which can process any recognized faces in a same manner. At present, some APPs can achieve a simple image synthesis function. For example, a mask and a face may be synthesized together.

However, with a conventional image synthesis method, in a synthetic image, a virtual object is at a fixed position and cannot move following a target object. In addition, the virtual object cannot be flexibly mounted on the target object. Generally, the virtual object can only be mounted on a predetermined position on a screen.

SUMMARY

In a first aspect of the present disclosure, an image synthesis method is provided. The image synthesis method includes: acquiring a virtual object, acquiring a video captured by an image sensor, recognizing a hand in the video and obtaining hand information, acquiring image rendering information corresponding to the virtual object and the hand information, and performing synthesis rendering on the virtual object and the hand based on the image rendering information to generate a synthetic image.

Further, the recognizing a hand in the video and obtaining hand information includes: recognizing the hand in the video and obtaining a position of the hand and key points of the hand.

Further, the acquiring image rendering information corresponding to the virtual object and the hand information includes: acquiring rendering positions of the virtual object and the hand, and a rendering order of the virtual object and the hand.

Further, the rendering positions are determined based on the position of the hand and/or key points of skeletons of the hand. The rendering order is determined based on a type of the virtual object.

Further, the performing synthesis rendering on the virtual object and the hand based on the image rendering information to generate a synthetic image includes: rendering the hand and the virtual object based on the rendering positions and the rendering order to generate the synthetic image.

Further, the acquiring image rendering information corresponding to the virtual object and the hand information includes: reading a rendering configuration file and acquiring the image rendering information from the rendering configuration file by using the virtual object and the hand information.

Further, the image rendering information includes one or more of a serial number of a key point of the hand to be followed by the virtual object, a scale of the virtual object, a rendering mode and a rendering order.

Further, before the reading a rendering configuration file, the image synthesis method further includes: setting the rendering configuration file by setting the image rendering information.

Further, the recognizing a hand in the video and obtaining hand information further includes: recognizing the hand in the video and obtaining an angle of the hand.

Further, the acquiring image rendering information corresponding to the virtual object and the hand information includes: acquiring rendering positions of the virtual object and the hand, rendering angles of the virtual object and the hand, and a rendering order of the virtual object and the hand.

In a second aspect of the present disclosure, an image synthesis apparatus is provided. The image synthesis apparatus includes a virtual object acquiring module, a video acquiring module, a hand recognizing module, a rendering information acquiring module and an image synthesizing module. The virtual object acquiring module is configured to acquire a virtual object. The video acquiring module is configured to acquire a video captured by an image sensor. The hand recognizing module is configured to recognize a hand in the video and obtain hand information. The rendering information acquiring module is configured to acquire image rendering information corresponding to the virtual object and the hand information. The image synthesizing module is configured to perform synthesis rendering on the virtual object and the hand based on the image rendering information to generate a synthetic image.

Further, the hand recognizing module includes a first recognizing module and a first information acquiring module. The first recognizing module is configured to recognize the hand in the video. The first information acquiring module is configured to acquire a position of the hand and key points of the hand.

Further, the rendering information acquiring module is configured to acquire rendering positions of the virtual object and the hand, and a rendering order of the virtual object and the hand.

Further, the rendering positions are determined based on the position of the hand and/or key points of skeletons of the hand. The rendering order is determined based on a type of the virtual object.

Further, the image synthesizing module is configured to render the hand and the virtual object based on the rendering positions and the rendering order to generate the synthetic image.

Further, the rendering information acquiring module further includes a reading module and a first rendering information acquiring module. The reading module is configured to read a rendering configuration file. The first rendering information acquiring module is configured to acquire the image rendering information from the rendering configuration file by using the virtual object and the hand information.

Further, the image rendering information includes one or more of a serial number of a key point of the hand to be followed by the virtual object, a scale of the virtual object, a rendering mixing mode and a rendering order.

Further, the rendering information acquiring module may further include a setting module. The setting module is configured to set the rendering configuration file by setting the image rendering information.

Further, the hand recognizing module further includes a second recognizing module and a second information acquiring module. The second recognizing module is configured to recognizing the hand in the video. The second information acquiring module is configured to acquire an angle of the hand.

Further, the rendering information acquiring module is configured to acquire rendering positions of the virtual object and the hand, rendering angles of the virtual object and the hand, and a rendering order of the virtual object and the hand.

In a third aspect of the present disclosure, electronic equipment is provided. The electronic equipment includes at least one processor and a memory in communication connection with the at least one processor.

The memory stores instructions executable by the at least one processor, and the instructions, when being executed by the at least one processor, cause the at least one processor to execute any image synthesis method according to the first aspect of the present disclosure.

In a fourth aspect of the present disclosure, a non-transitory computer readable storage medium is provided. The non-transitory computer readable storage medium stores computer instructions used to make a computer execute any image synthesis method according to the first aspect of the present disclosure.

An image synthesis method, an image synthesis apparatus, electronic equipment and a non-transitory computer readable storage medium are provided according to embodiments of the present disclosure. The image synthesis method includes: acquiring a virtual object, acquiring a video captured by an image sensor, recognizing a hand in the video and obtaining hand information, acquiring image rendering information corresponding to the virtual object and the hand information and performing synthesis rendering on the virtual object and the hand based on the image rendering information to generate a synthetic image. With the technical solution according to embodiments of the present disclosure, the technical problem in the conventional technology that a virtual object cannot move with the hand and cannot be flexibly mounted on the hand is solved.

The above description is merely an overview of technical solutions in the present disclosure. In order to make technique means of the present disclosure more clear so as to be implemented according to the present disclosure, and make the above and other purposes, features and advantages better understood, preferred embodiments are described in detail below in conjunction with drawings.

BRIEF DESCRIPTION OF THE DRAWINGS

In order to more clearly describe the technical solutions in the embodiments of the present disclosure or the conventional technology, drawings to be used in the description of the embodiments of the present disclosure or the conventional technology are briefly described hereinafter. It is apparent that the drawings described below merely show some embodiments of the present disclosure, and those skilled in the art may obtain other drawings according to the provided drawings without any creative effort.

DETAILED DESCRIPTION OF EMBODIMENTS

Embodiments of the present disclosure are described with specific examples hereinafter and those skilled in the art may easily learn about other advantages and uses of the present disclosure from details disclosed in the present specification. Apparently, embodiments described below are merely some, rather than all of embodiments according to the present disclosure. The present disclosure may be implemented or applied in other different embodiments. For different applications, details of the present specification may be modified or changed without departing from the spirit of the present disclosure. It is noted that, embodiments below and features in the embodiments may be in combination with each other as long as there is no conflict. Based on embodiments of the present disclosure, all other embodiments obtained by those skilled in the art without creative efforts belong to the scope of the present disclosure.

It is noted that below describes various aspects of embodiments in the scope of the attached claims. Apparently, the various aspects described herein may be implemented in various forms, and any specific structures and/or functions described herein are only illustrative. According to the present disclosure, those skilled in the art should know that any aspects described herein may be implemented independently from other aspects or may be implemented in combination with one or more other aspects in various ways. For example, devices and/or methods may be implemented by using any number of aspects of the present specification. In addition, other structures and/or functions than one or more aspects of the present disclosure may be used to implement the device and/or method.

It is noted that, the drawings provided in the following embodiments are merely used to schematically explain basic elements of the present disclosure. The drawings only show elements relating to the present disclosure and are not drawn according to actual number, shape and size of the elements. The shape, number and scale of each element in practical implementations may be changed arbitrarily and the configuration of the elements may be more complex.

Moreover, in the following description, specific details are provided for better understanding of the embodiments. However, those skilled in the art should know that the aspects of the present disclosure may be implemented without the specific details.

Figure 1:
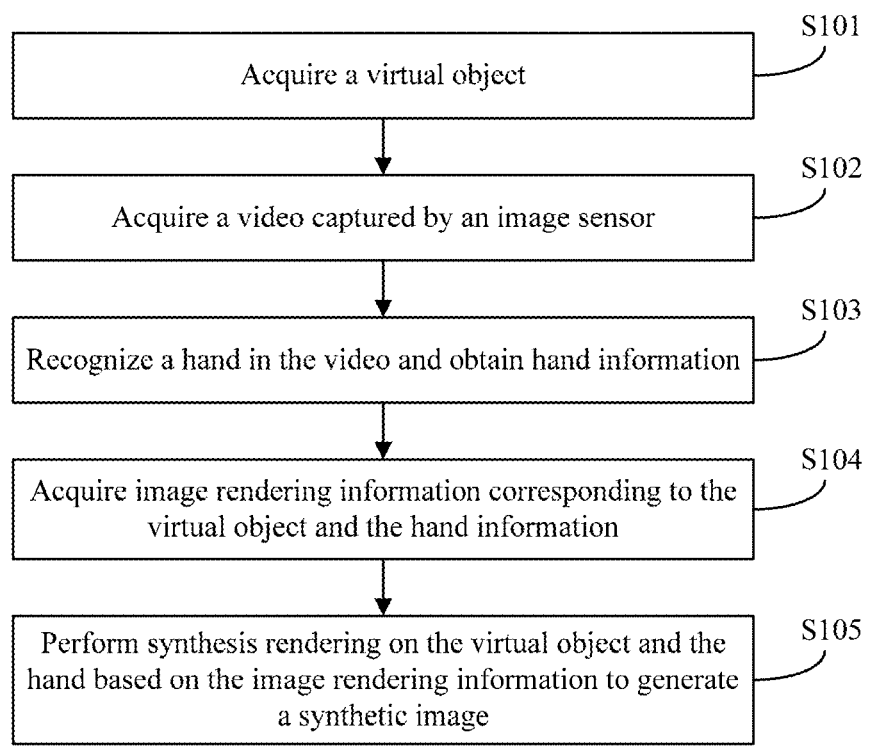
FIG. 1 is a flowchart of an image synthesis method according to a first method embodiment of the present disclosure.

FIG. 1 is a flowchart of an image synthesis method according to a first method embodiment of the present disclosure. The image synthesis method according to the first method embodiment may be performed by an image synthesis apparatus. The image synthesis apparatus may be implemented as software or a combination of software and hardware. The image synthesis apparatus may be integrated in a device in an image processing system, such as an image processing server or an image processing terminal device. As shown in FIG. 1, the image synthesis method includes steps S101 to S105.

In step S101, a virtual object is acquired.

The virtual object may be any types of 2D virtual objects and 3D virtual objects. A typical virtual object may be a virtual weapon, such as a virtual sword and a virtual handgun, or may be virtual stationery, such as a virtual pen and a virtual book, or may be a virtual wearable article, such as a virtual glove and a virtual ring, which are not limited herein. Any virtual objects that may be mounted on a hand may serves as the virtual object according to the present disclosure. The virtual object may be implemented in various types. For example, the virtual object may be in a type suitable for being gripped by a hand, such as the virtual sword, a virtual handgun and a virtual pen, or may be in a type suitable for being worn, such as a virtual glove and a virtual ring, or may be in a type suitable for being put on a palm, such as a virtual book. Apparently, a same virtual object may belong to more than one type. For example, a virtual book belongs to both the type suitable for being put on a palm and the type suitable for being gripped by a hand.

In step S102, a video captured by an image sensor is acquired.

The image sensor refers to various devices capable of capturing an image. A typical image sensor may be a video recorder, a camera and the like. In the embodiment, the image sensor may be a camera of a mobile terminal, such as a front camera or a back camera of an intelligent phone. A video image captured by the camera may be directly displayed on a display screen of the intelligent phone. In this step, the video captured by the image sensor is acquired to be used in image recognition in a next step.

In step S103, a hand in the video is recognized and hand information is obtained.

When recognizing the hand, a position of the hand may be obtained based on color features, and then a hand image is segmented from a background. Feature extraction and recognition are performed on the segmented hand image. Specifically, the image sensor acquires color information and position information corresponding to the color information of the segmented hand image. The color information is compared with predetermined hand color information to recognize first color information. An error between the first color information and the predetermined hand color information is less than a first threshold. Based on position information corresponding to the first color information, a contour of the hand is determined. Preferably, in order to avoid an interference with the color information caused by an ambient luminance, image data captured by the image sensor may be mapped from an RGB color space into an HSV color space so as to use information in the HSV color space to perform the comparison. Preferably, hue information in the HSV color space serves as the color information. Since the hue information is less affected by the ambient luminance, an interference caused by the ambient luminance can be well eliminated. After the position of the hand is roughly determined based on the contour of the hand, key point extraction is performed on the hand, which is to determine, in the segmented hand image, a position coordinate of each of key points of the hand contour, also known as key point locating. The key point locating is performed based on image features of the key points After the image features that are capable of clearly marking the key points, search and comparison are performed on the segmented hand image based on the image features to accurately acquire positions of the key points in the image. Since the key points occupy a very small area (generally only a few to dozens of pixels) of the image, image features of the key points occupy very limited partial regions of the image. At present, there are two manners to perform the feature extraction, one is the feature extraction performed in a one-dimensional range along vertical contour, and the other is the feature extraction performed in a two-dimensional range of a square neighborhood of a key point. The above two manners may be implemented with multiple methods, such as an ASM/AAM method, a statistical energy function method, a regression analysis method, a deep learning method, a classifier method and a batch extraction method. The numbers of the key points used in the above implementation methods are different, which can achieve different accuracy and speeds, and thus can be used for different application scenarios. Similarly, the same principle may be applied to recognize other target objects.

After the hand is recognized, a polygon is drawn surrounding the contour of the hand, which serves as a circumscribed test box of the hand. The circumscribed test box is used to replace the hand to describe a position of the hand. The circumscribed test box is described as a rectangle herein as an example. After the key points of the hand are recognized, a width of the widest part of the hand and a length of the longest part of the hand may be calculated to define the circumscribed test box of the hand based on the width and the length. The length and the width of the hand may be calculated by extracting key points of hand boundary and calculating a difference of X coordinates of two farthest key points of the hand boundary in the X coordinate as the width of the rectangle and calculate a difference of Y coordinates of two farthest key points of the hand boundary in the Y coordinate as the length of the rectangle. In a case that the hand makes a fist, the circumscribed test box may be set as a smallest circle that is capable of covering the fist. Specifically, a central point of the circumscribed test box may serve as the position of the hand. The central point of the circumscribed test box is an intersection of two diagonals of the circumscribed test box. Similarly, the position of the first may be replaced by a center of the circle.

The hand information further includes the extracted key points of the hand. The number of the extracted key points of the hand may be predetermined. Generally, the extracted key points of the hand may include the key points of the hand counter and key points of hand knuckles. Each of the extracted key points of the hand has a fixed serial number. For example, the extracted key points of the hand may be numbered in an order of up to down and an order of the key points of the hand counter, key points of thumb knuckles, key points of index knuckles, key points of middle-finger knuckles, key points of ring finger knuckles and key points of little finger knuckles. In a typical application, there are 22 key points and each key point has a fixed serial number.

In an embodiment, the hand information may further include an angle of the hand. The angle of the hand may include an angle of the hand in an image plane, or an angle of the hand in a space, or a combination thereof. In an implementation, the angle of the hand may be determined based on the circumscribed test box. In the image plane, an angle by which the circumscribed test box is offset with respect to X-axis may be calculated. In the space, an area ratio of the circumscribed test box may be detected to determine a rotation angle of the hand in the space based on a correspondence relation between the zoom level and the rotation angle. For example, in a case that a palm right faces a camera, the detected circumscribed test box has a largest area. When the palm is rotated, the area of the detected circumscribed test box is gradually decreased. A relation between a proportion of a decreased area and the rotation angle may be preset. In this way, the rotation angle of the palm may be calculated based on the area of the circumscribed test box. Apparently, the method of obtaining the angle of the hand is not limited to the described method in the embodiment. Any method that can determine the angle of the hand may be applied to the embodiment of the present disclosure to obtain the angle of the hand.

In an embodiment, before calculating the hand information, the method further includes performing a smoothing processing and a coordinate normalization processing on data of the recognized hand. Specifically, in the smoothing processing, multiple frames of the video may be averaged. An image obtained by the averaging serves as a recognized image. For the hand in the present disclosure, the hand may be recognized in the multiple frames of images. Then a weighted average processing is performed on the recognized hand images. The weighted average hand image serves as a recognized hand to calculate the hand information. In this way, even in a case that some frames are lost or some images recognized from some frames are not clear, the hand image can still be determined to calculate the hand information. In the coordinate normalization processing, coordinate ranges are unified. For example, since a coordinate range of the hand image captured by a camera may be different from that of a hand image displayed on a display screen, it is required to map a large coordinate system into a small coordinate system based on a mapping relation. After the smoothing processing and the coordinate normalization processing, the hand information are obtained.

In step S104, image rendering information corresponding to the virtual object and the hand information are acquired.

In this step, the image rendering information at least includes rendering positions of the virtual object and the hand, and a rendering order of the virtual object and the hand. The rendering positions include a rendering position of the virtual object and a rendering position of the hand. The rendering position of the hand may be the position of the recognized hand. The rendering position of the virtual object may be associated with the position of the hand. For example, in a case that the position of the hand is determined as the central point of the circumscribed test box in step S103, the rendering position of the virtual object may be coincident with the central point. In this case, a central position of the virtual object may be coincident with the central point of the circumscribed test box. Alternatively, there may be a predetermined positional relation between the rendering position of the virtual object and the central point of the circumscribed test box. For example, the rendering position of the virtual object may be located at a location right above the central point along the y-axis by one unit length. The unit length may be customized. For example, one unit length is equal to 1 cm or the like, which is not limited herein. In general, the rendering position of the virtual object may be determined based on the predetermined positional relation. In this way, positions on which the hand and the virtual object are displayed are determined. In order to accurately determine the rendering positions, the key points of the hand may be taken into consideration. In this case, it may be set that the virtual object is mounted at some key points of the hand. In an implementation, three points at the virtual object may be selected to correspond to three key points of the hand. By using the correspondence relation, the rendering position of the virtual object may be determined.

The rendering order determines a relation between a display of the virtual object and a display of the hand. In some scenarios, the virtual object may cover the hand or may be covered by the hand. For example, in a case that the hand grips the virtual sword, it is required to cover the part of the virtual sword griped by the hand with the hand. For another example, in a case that the hand wears a glove, it is required to cover the hand with the glove. In some cases such as the case that the hand wears a glove, it is required to render the hand prior to the virtual object to cover the hand with the virtual object. In other cases such as the case that the hand grips the sword, it is required to render the virtual object prior to the hand to cover the virtual object with the hand. The rendering order is related to a type of the virtual object. Apparently, the virtual object may be predetermined with a layer for rendering. For example, it may be predetermined that a handle of the sword is always rendered on a bottom layer and a glove is always rendered on a top layer.

In an embodiment, the hand information obtained in step S103 includes angle information of the hand. In this case, the acquired image rendering information further includes a rendering angle, which determines angles of a rendered hand and a rendered virtual object, such that the angle of the rendered virtual object varies with the angle of the rendered hand. For example, in a case that the hand griping the virtual sword waves, the angle of the rendered virtual sword varies with the angle of the moving hand.

In step S105, synthesis rendering is performed on the virtual object and the hand based on the image rendering information to generate a synthetic image.

In the embodiment, based on the image rendering information acquired in step S104, the synthesis rendering is performed on the virtual object acquired in step S101 and the hand recognized in step S103 to generate the synthetic image.

In an implementation, rendering positions of the hand and the virtual object are obtained based on rendering position information acquired in step S104. The rendering angle of the hand and the rendering angle of the virtual object are obtained based on the rendering angle information acquired in step S104. The hand and the virtual object are rendered based on the rendering order acquired in step S104 to generate the synthetic image of the hand and the virtual object.

An image synthesis method, an image synthesis apparatus, electronic equipment and computer readable storage medium are provided according to embodiments of the present disclosure. The image synthesis method includes: acquiring a virtual object, acquiring a video captured by an image sensor, recognizing a hand in the video and obtaining hand information, acquiring image rendering information corresponding to the virtual object and the hand information and performing synthesis rendering on the virtual object and the hand based on the image rendering information to generate a synthetic image. According to embodiments of the present disclosure, the hand information is acquired to determine the image rendering information, such that the image rendering information is related to the hand, thereby solving the technical problem in the conventional technology that a virtual object cannot move with the hand and cannot be flexibly mounted on the hand.

Figure 2A:
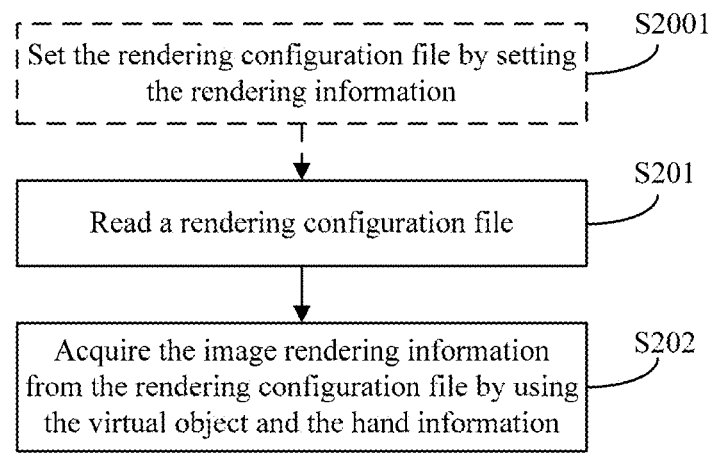
FIG. 2a is a flowchart of step S104 of an image synthesis method according to a second method embodiment of the present disclosure.

As shown in FIG. 2a, in another method embodiment of the image synthesis method according to the present disclosure, the acquiring image rendering information corresponding to the virtual object and the hand information in step S104 includes steps S201 to S202.

In step S201, a rendering configuration file is read.

In step S202, the image rendering information is acquired from the rendering configuration file by using the virtual object and the hand information.

In the embodiment, a path for saving sequence frames of the virtual object is saved in the rendering configuration file. In step S101, a name or an ID of the virtual object is acquired. Based on the name or the ID, the sequence frames of the virtual object may be acquired in the rendering configuration file, where all the sequence frames form a whole virtual object. Specifically, in the rendering configuration file, a parameter "range": [idx_start, idx_end] may be set to represent a series of files from idx_start to idx_end in a file list, which form the sequence frames. Alternatively, in the rendering configuration file, a parameter "idex":[idex0, idex1, . . . ] may be set to represent a series of files idx0, idx1 and the like in a file list, which form the sequence frames in order.

The rendering configuration file further includes an association parameter for the position of the virtual object. The association parameter is used to describe key points of the hand to be associated with the virtual object. By default it may be set that the virtual object is associated with all of the key points of the hand. Alternatively, it may be set that the virtual object is required to follow some of the key points of the hand. In addition to the association parameter, the rendering configuration file further includes a positional relation parameter "point" for describing the positional relation between the virtual object and the associated points. The positional relation parameter "point" may include two groups of associated points, in which "point0" represents a first group of associated points and "point1" represents a second group of associated points. For each group of associated points, "point" describes a position of an anchor point in a camera, which is obtained by calculating a weighted average of key points in several groups. A serial number of each key point is represented by a field "idex". For a hand with the test box, "topleft", "topright", "bottomleft" and "bottomright" may also be used to respectively represents four corners of the circumscribed test box (or four corners of a foreground screen). For example, it is set that the virtual object follows four key points of the hand, which are key point 9, key point 10, key point 11 and key point 12, each having a weight of 0.25 and respectively having coordinates of $(X_9, Y_9)$, $(X_{10}, Y_{10})$, $(X_{11}, Y_{11})$ and $(X_{12}, Y_{12})$. Therefore, an X-axis coordinate and a Y-axis coordinate of an anchor point to be followed by the virtual object may be calculated as $X_a = X_9*0.25 + X_{10}*0.25 + X_{11}*0.25 + X_{12}*0.25$, $Y_a = Y_9*0.25 + Y_{10}*0.25 + Y_{11}*0.25 + Y_{12}*0.25$. It is to be understood that, the number of groups of the associated points included in "point" is not limited to two. In the above embodiment, two anchor points may be obtained. The virtual object moves with the two anchor points. However, in practical applications, the number of anchor points may be more than two, which is related to the number of groups of the associated points. A coordinate of each of the key points may be acquired from the hand information acquired in step S103.

The rendering configuration file may further include a relation between a scaling level of the virtual object and the key points. Parameters "scaleX" and "scaleY" are used to respectively represent scaling requirements in an X direction and a Y direction. For each direction, two parameters "start_idx" and "end_idx" are included, which represents two key points. The scaling level may be obtained by multiplying a distance between the two key points by a value of a parameter "factor". The parameter "factor" may be any value that is predetermined. In a case that "position" only includes one group of associated points "point0", the X direction refers to a horizontal direction to the right and the Y direction refers to a vertically downward direction. The parameters "scaleX" and "scaleY" are both valid. However, in a case that one of "scaleX" and "scaleY" is absent, the virtual object is scaled based on the other presented parameter while keeping an original length-width ratio of the virtual object. In a case that "position" includes "point0" and "point1", the X direction refers to a direction of a vector obtained by calculating point1.anchor-point0.anchor and the Y direction is determined by clockwise rotating the X direction by 90 degrees. In this case, "scaleX" is invalid and the scaling level in the X direction is determined based on the anchor point, but "scaleY" is valid. However, in a case that "scaleY" is absent, the virtual object is scaled while keeping the original length-width ratio of the virtual object.

The rendering configuration file may further include a rotation parameter "rotationtype" of the virtual object. Only in a case that "position" only includes "point0", "rotationtype" is valid. The rotation parameter "rotationtype" may include two values, namely 0 and 1, where 0 indicates that the virtual object is not required to be rotated, and 1 indicates that the virtual object is required to be rotated based on related angles of the key points.

The rendering configuration file may further include a rendering mixing mode. The rendering mixing means mixing two colors together. Specifically, in the present disclosure, the rendering mixing means mixing a color of a pixel position and a color to be rendered together to realize a special effect. The rendering mixing mode refers to a manner of mixing. Generally, the mixing refers to a calculation using a source color and a target color to obtain a mixed color. In practical applications, the mixed color is usually obtained by a calculation using a product of the source color and a source factor and a product of the object color and an object factor. For example, in a case that the calculation is addition, BLENDcolor=SRC_color*SCR_factor+DST_color*DST_factor, where $0 \leq SCR\_factor \leq 1$, $0 \leq DST\_factor \leq 1$. Based on the above operational formula, given that four components of the source color (red, green, blue and alpha) are respectively (Rs, Gs, Bs, As), four components of the object color are respectively (Rd, Gd, Bd, Ad), source factors are respectively (Sr, Sg, Sb, Sa), and object factors are respectively (Dr, Dg, Db, Da), a new color generated by mixing the two colors may be expressed by (Rs*Sr+Rd*Dr, Gs*Sg+Gd*Dg, Bs*Sb+Bd*Db, As*Sa+ Ad*Da). Alpha represents a transparency and 0≤alpha≤1. The above rendering mixing mode is merely exemplary. In practical applications, the mixing mode may be customized. The predetermined calculation may be addition, subtraction, multiplication, division, taking a larger one of two values, taking a smaller one of two values and a logical operation (a logical AND operation, a logical OR operation, a logical XOR operation and the like). The above rendering mixing mode is merely exemplary. In practical applications, the mixing mode may be customized. The predetermined calculation may be addition, subtraction, multiplication, division, taking a larger one of two values, taking a smaller one of two values and a logical operation (a logical AND operation, a logical OR operation, a logical XOR operation and the like).

The rendering configuration file may further include the rendering order. The rendering order includes a first rendering order and a second rendering order. The first rendering order represents a rendering order of the sequence frames of the virtual object, which may be defined by a parameter "zorder". A small value of "zorder" indicates an early rendering of the sequence frame. The second rendering order represents the rendering order of the virtual object and the hand, which may be determined in multiple manners. Typically, by using parameters similar to "zorder", it may be directly set that the hand is rendered prior to the virtual object or the virtual object is rendered prior to the hand. In an embodiment, the second rendering order may be determined by a depth testing. In the depth testing, a depth buffer corresponding to a color buffer is set. The depth buffer stores depth value of pixels and the color buffer stores color value of the pixels. In determining whether to render a surface of an object, a depth value of a pixel corresponding to the surface is compared with the depth value stored in the depth buffer. If the depth value of the pixel corresponding to the surface is greater than or equal to the depth value stored in the depth buffer, the part is discarded. If the depth value of the pixel corresponding to the surface is less than the depth value stored in the depth buffer, the depth value and the color value of the pixel are used to respectively update the depth buffer and the color buffer. The above process is called "depth testing". Before a scene is rendered, the depth buffer is cleared when clearing the color buffer. When clearing the depth buffer, the depth value stored in the depth buffer is set to be 1, which represents a largest depth value. The depth value ranges from 0 to 1. A small depth value indicates a small distance to an observer, and a large depth value indicates a large distance to the observer. When the depth testing is enabled, it is required to set a comparison function for the depth testing. Typical comparison functions are DF_ALWAYS, DF_NEVER, DF_LESS, DF_EQUAL, DF_LEQUAL, DF_GREATER, DF_NOTEQUAL and DF_GEQUAL. DF_ALWAYS means always passing the depth testing, which is equivalent to a case that the depth testing is not enabled, that is, a depth value and a color value of a current pixel are always used to update the depth buffer and the color buffer. DF_NEVER means always failing the depth testing. In this case, the depth value stored in the depth buffer and the color value stored in the color buffer remain unchanged, that is, no pixel will be rendered on a screen. DF_LESS means that, in a case that a depth value of the current pixel is less than the depth value stored in the depth buffer, the current pixel passes the depth testing. DF_EQUAL means that, in a case that the depth value of the current pixel is equal to the depth value stored in the depth buffer, the current pixel passes the depth testing. DF_LEQUAL means that, in a case that the depth value of the current pixel is equal to or less than the depth value stored in the depth buffer, the current pixel passes the depth testing. DF_GREATER means that, in a case that the depth value of the current pixel is greater than the depth value stored in the depth buffer, the current pixel passes the depth testing. DF_NOTEQUAL means that, in a case that the depth value of the current pixel is not equal to the depth value stored in the depth buffer, the current pixel passes the depth testing. DF_GEQUAL means that, in a case that the depth value of the current pixel is greater than or equal to the depth value stored in the depth buffer, the current pixel passes the depth testing. Depth writing is associated with the depth testing. Generally, in a case that the depth testing is enabled and a result of the depth testing may cause an update of the depth value stored in the depth buffer, it is required to enable the depth writing so as to update the depth value stored in the depth buffer. An example is given below to describe a process of rendering an image in a case that the depth testing and the depth writing are enabled. In the example, it is required to render two color blocks, which are a red block and a yellow block. In a rendering queue, the red block is in front of the yellow block. A depth value of the red block is equal to 0.5 and a depth value of the yellow block is equal to 0.2. The depth testing comparison function DF_LEQUAL is used. In this case, 0.5 is firstly written in the depth buffer and red is written in the color buffer. When rendering the yellow block, since 0.2 is less than 0.5, it is determined that the yellow block passes the depth testing. Therefore, the depth value stored in the depth buffer is updated to 0.2 and the color value stored in the color buffer is updated to yellow. That is, since the depth value of the yellow block is relatively small, it is required to cover the red block having a relatively large depth value. With the above method, the rendering order of the hand and the virtual object may be determined to achieve an effect of a synthetic image.

Further, before step S201, the method may further include step S2001. In step S2001, the rendering configuration file is set by setting the above various parameters in the rendering file.

Figure 2B:
FIG. 2b-2d are schematic diagrams showing an specific example of the image synthesis method according to the present disclosure.
Figure 2C:
Figure 2D:

To facilitate understanding, FIG. 2b to FIG. 2d are provided to show a specific example of the image synthesis method according to the present disclosure. FIG. 2b shows a video frame in a video captured by an imaging sensor. In an initial state, it is detected that two opened palms, which triggers synthesis of the opened palms and a virtual rainbow. The virtual rainbow is mounted at index fingers of the two hands. When moving a palm, as shown in FIG. 2c, when the right hand moves upwards, the virtual rainbow rises with the rising index finger of the right hand. As shown in FIG. 2d, when the left hand moves upwards, the virtual rainbow rises with the rising index finger of the left hand. Apparently, it may be a case that one hand moves upwards while another hand moves downwards. In this case, the two ends of the virtual rainbow are still mounted respectively at two index fingers of the right hand and the left hand, and a length of the virtual rainbow may be changed in response to a change of a distance between the right hand and the left hand.

Figure 3:
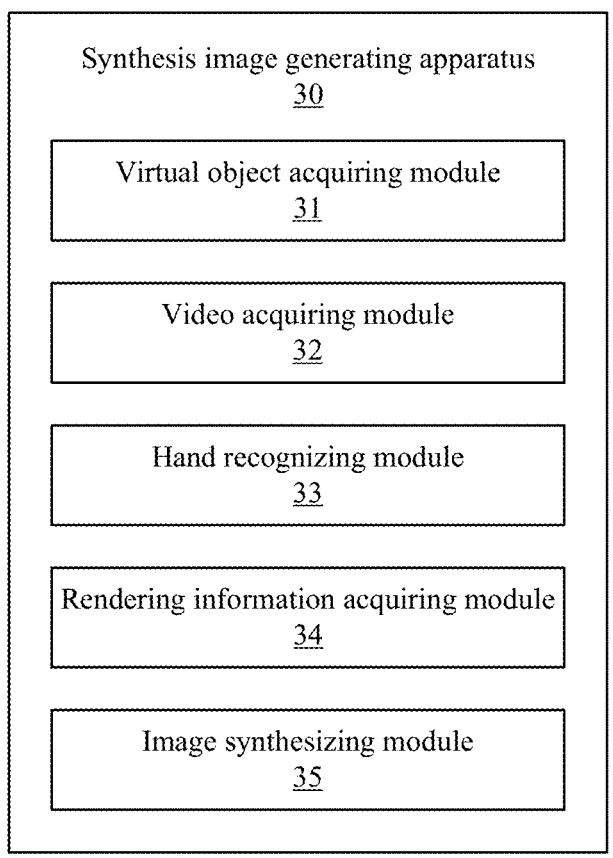
FIG. 3 is a schematic structural diagram of an image synthesis apparatus according to a first apparatus embodiment of the present disclosure.

FIG. 3 is a schematic structural diagram of an image synthesis apparatus 30 according to a first apparatus embodiment of the present disclosure. As shown in FIG. 3, the image synthesis apparatus 30 includes a virtual object acquiring module 31, a video acquiring module 32, a hand recognizing module 33, a rendering information acquiring module 34 and an image synthesizing module 35.

The virtual object acquiring module 31 is configured to acquire a virtual object.

The video acquiring module 32 is configured to acquire a video captured by an image sensor.

The hand recognizing module 33 is configured to recognize a hand in the video and obtain hand information.

The rendering information acquiring module 34 is configured to acquire image rendering information corresponding to the virtual object and the hand information.

The image synthesizing module 35 is configured to perform synthesis rendering on the virtual object and the hand based on the image rendering information to generate a synthetic image.

Further, the hand recognizing module 33 includes a first recognizing module and a first information acquiring module. The first recognizing module is configured to recognize the hand in the video. The first information acquiring module is configured to acquire a position of the hand and key points of the hand.

Further, the rendering information acquiring module 34 is configured to acquire rendering positions of the virtual object and the hand, and a rendering order of the virtual object and the hand.

Further, the rendering positions are determined based on the position of the hand and/or key points of skeletons of the hand. The rendering order is determined based on a type of the virtual object.

Further, the image synthesizing module 35 is configured to render the hand and the virtual object based on the rendering positions and the rendering order to generate the synthetic image.

Further, the hand recognizing module 33 further includes a second recognizing module and a second information acquiring module. The second recognizing module is configured to recognizing the hand in the video. The second information acquiring module is configured to acquire an angle of the hand.

Further, the rendering information acquiring module 34 is configured to acquire rendering positions, rendering angles and a rendering order of the virtual object and the hand.

The apparatus shown in FIG. 3 may perform the method according to the embodiment shown in FIG. 1. For parts not described in detail in this embodiment, one may refer to relevant explanations of the embodiment shown in FIG. 1. The process and technical effect of the technical solution may be known from the description of the embodiment shown in FIG. 1, which are not repeated herein.

Figure 4:
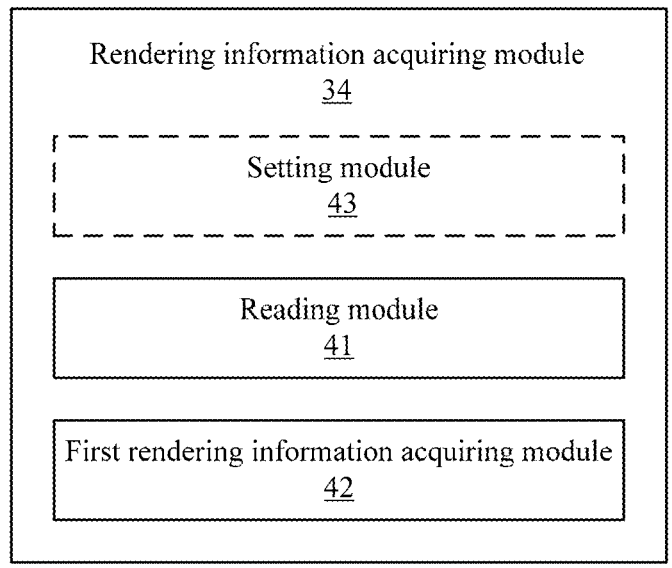
FIG. 4 is a schematic structural diagram of a rendering information acquiring module of an image synthesis apparatus according to a second apparatus embodiment of the present disclosure.

In a second apparatus embodiment of the image synthesis apparatus according to the present disclosure, as shown in FIG. 4, the rendering information acquiring module 34 further includes a reading module 41 and a first rendering information acquiring module 42. The reading module 41 is configured to read a rendering configuration file. The first rendering information acquiring module 42 is configured to acquire the image rendering information from the rendering configuration file by using the virtual object and the hand information.

In the embodiment, the rendering information acquiring module 34 may further include a setting module 43. The setting module 43 is configured to set the rendering configuration file by setting the image rendering information.

The image synthesis apparatus according to the second apparatus embodiment may perform the image synthesis method according to the embodiment shown in FIG. 2. For parts not described in detail in this embodiment, one may refer to relevant explanations of the embodiment shown in FIG. 2. The process and technical effect of the technical solution may be known from the description of the embodiment shown in FIG. 2, which are not repeated herein.

Figure 5:
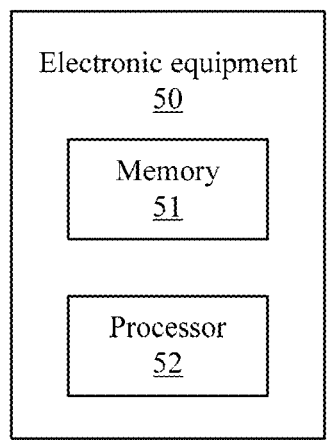
FIG. 5 is a schematic structural diagram of electronic equipment according to an embodiment of the present disclosure.

FIG. 5 is a hardware block diagram of electronic equipment according to an embodiment of the present disclosure. As shown in FIG. 5, the electronic equipment 50 according to an embodiment of the present disclosure includes a memory 51 and a processor 52.

The memory 51 is configured to store non-transitory computer readable instructions. Specifically, the memory 51 may include one or more computer program products. The computer program products may include various forms of computer readable storage medium, such as a volatile memory and/or a nonvolatile memory. The volatile memory may include a random access memory (RAM) and/or a cache memory (cache), and the like. The nonvolatile memory may include a read-only memory (ROM), a hard disk, a flash memory, and the like.

The processor 52 may be a central processing unit (CPU) or another type of processing unit with data processing capacity and/or instruction execution capacity. The processor 52 can control other modules in the electronic equipment 50 to execute desired functions. In an embodiment of the present disclosure, the processor 52 is configured to execute the computer readable instructions stored in the memory 51 to control the electronic equipment 50 to execute some or all steps of the image synthesis method according to aforementioned embodiments of the present disclosure.

Those skilled in the art should understand that well-known structures such as a communication bus and an interface may be included in some embodiments to provide good user experience and the well-known structures also fall within the scope of the present disclosure.

For a detailed description of the present embodiment, one may refer to relevant descriptions of the aforementioned embodiments, which are not repeated herein.

Figure 6:
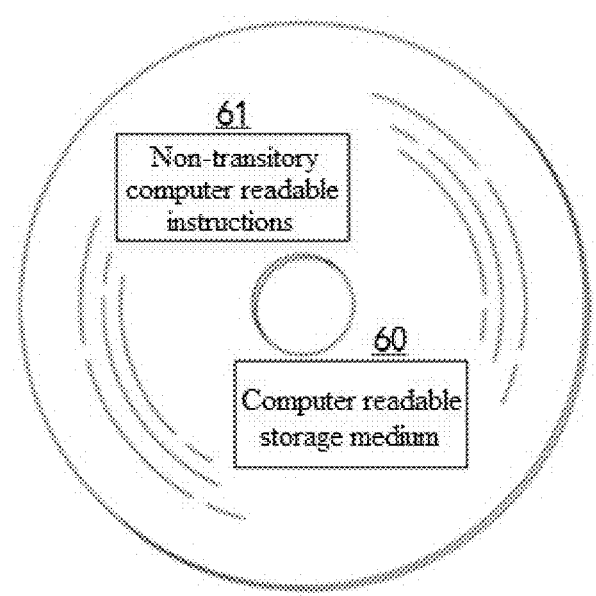
FIG. 6 is a schematic structural diagram of a computer readable storage medium according to an embodiment of the present disclosure.

FIG. 6 is a schematic diagram showing the computer readable storage medium according to an embodiment of the present disclosure. As shown in FIG. 6, non-transitory computer readable instructions 61 are stored in a computer readable storage medium 60 according to an embodiment of the present disclosure. Some or all steps of the image synthesis method according to aforementioned embodiments of the present disclosure are executed when the non-transitory computer readable instructions 61 are executed by the processor.

The computer readable storage medium 60 includes but is not limited to an optical storage medium (such as CD-ROM and DVD), a magneto-optical storage medium (such as MO), a magnetic storage medium (such as a tape and a movable hard disk), a medium with an inbuilt rewritable nonvolatile memory (such as a memory card), and a medium with an inbuilt ROM (such as a ROM box).

For a detailed description of the present embodiment, one may refer to relevant descriptions of the aforementioned embodiments, which are not repeated herein.

Figure 7:
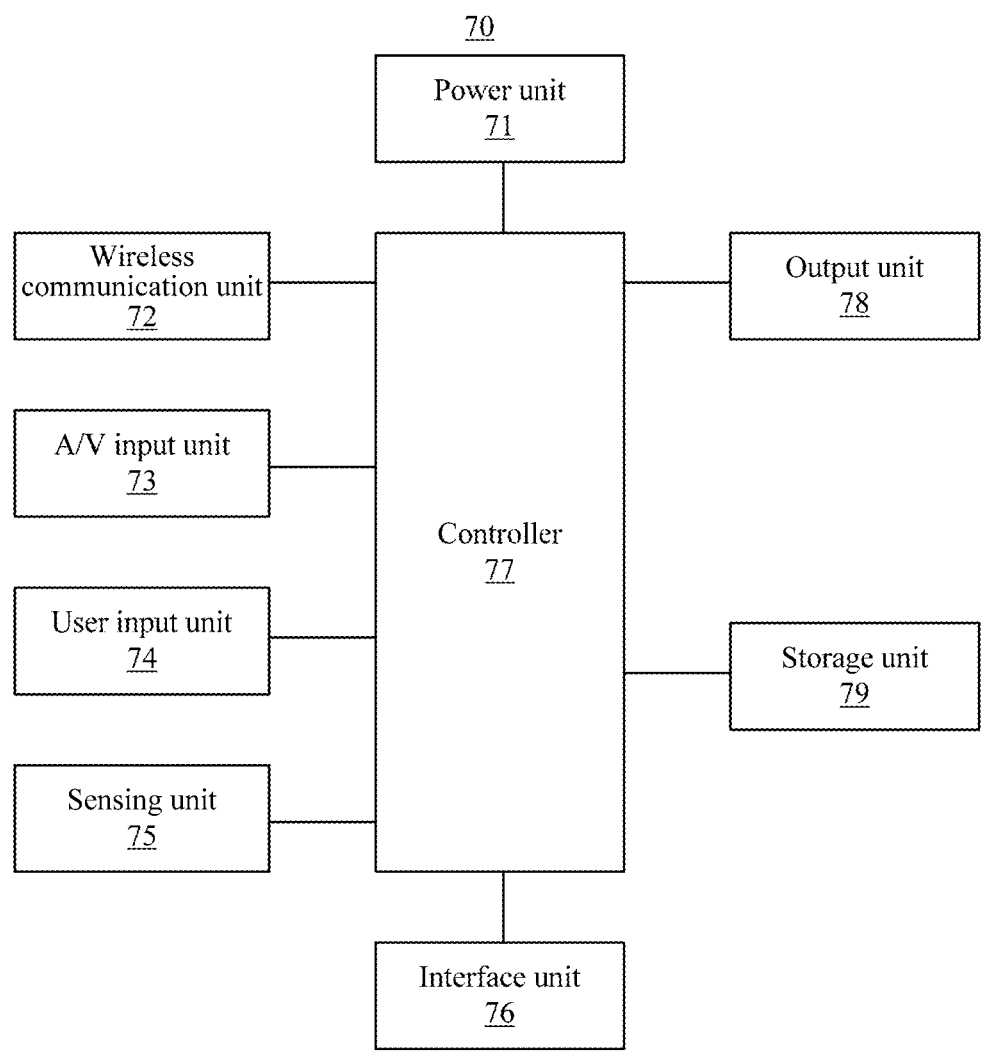
FIG. 7 is a schematic structural diagram of an image synthesis terminal according to an embodiment of the present disclosure.

FIG. 7 is a schematic hardware structural diagram of a terminal device according to an embodiment of the present disclosure. As shown in FIG. 7, the image synthesis terminal 70 includes the image synthesis apparatus according to the above embodiments.

The terminal device may be implemented in various forms. The terminal device according to the present disclosure includes but is not limited to mobile terminal devices such as a mobile phone, a smart phone, a laptop computer, a digital broadcast receiver, a PDA (personal digital assistant), a PAD (tablet computer), a PMP (Portable Multimedia Player), a navigation device, a vehicle terminal device, a vehicle display terminal, and a vehicle electronic rearview mirror, and fixed terminal devices such as a digital TV and a desk computer.

As alternatives of the above embodiments, the terminal may also include other elements. As shown in FIG. 7, the image synthesis terminal 70 may include a power unit 71, a wireless communication unit 72, an A/V (audio/video) input unit 73, a user input unit 74, a sensing unit 75, an interface unit 76, a controller 77, an output unit 78, a storage unit 79, and the like. FIG. 7 shows a terminal with various modules, but it should be understood that not all shown modules are necessary, and more or less modules may be implemented alternatively.

The wireless communication unit 72 allows wireless communication between the terminal 70 and a wireless communication system or a wireless communication network. The A/V input unit 73 is configured to receive an audio signal or a video signal. The user input unit 74 may generate key input data based on a command inputted by a user, to control various operations of the terminal device. The sensing unit 75 is configured to detect a current state of the terminal 70, a location of the terminal 90, presentence of a touch input of a user to the terminal 70, the orientation of the terminal 70, accelerated or decelerated movement of the terminal 70, and a direction of movement of the terminal 70, to generate a command or a signal for controlling the operation of the terminal 70. The interface unit 76 is configured to connect at least one external device to the terminal 70. The output unit 78 is configured to output a signal in a visual, audio and/or tactile way. The storage unit 79 may store software programs of processes and controlling operations executed by the controller 77. The storage unit 79 may also temporarily store data to be outputted or data already outputted. The storage unit 79 may include at least one type of storage medium. Furthermore, the terminal 70 may collaborate with network memory device having the storage function of the storage unit 79 via a network connection. The controller 77 usually controls overall operations of the terminal device. In addition, the controller 77 may include a multimedia module configured to reproduce or playback multimedia data. The controller 77 may execute pattern recognition processing to recognize handwriting input or picture drawing input on a touch screen as a character or an image. Under the control of the controller 77, the power unit 71 receives external electric power or internal electric power and provides proper electric power required for operating various elements and modules.

The embodiments of the image synthesis method according to the present disclosure may be implemented by computer software, computer hardware or any combination thereof in a form of computer readable medium. For hardware implementation, the embodiments of the image synthesis method according to the present disclosure may be implemented by one of an application specific integrated circuit (ASIC), a digital signal processor (DSP), a digital signal processing device (DSPD), a programmable logic device (PLD), a field programmable gate array (FPGA), a processor, a controller, a microcontroller, and a microprocessor which are designed to execute at least one of functional electronic units described above. In some cases, the embodiments of the image synthesis method according to the present disclosure may be implemented by the controller 77. For software implement, the embodiments of the image synthesis method according to the present disclosure may be implemented by individual software module designed to execute at least one function or operation. Software code may be implemented by software application programs (or programs) written in any proper program language. The software code may be stored in the storage unit 79 and executed by the controller 77.

For a detailed description of the present embodiment, one may refer to relevant descriptions of the aforementioned embodiments, which are not repeated herein.

General principles of the present disclosure are described in conjunction with specific embodiments. However, it should be noted that advantages, superiorities and effects mentioned in the present disclosure are only examples rather than restrictions. Each embodiment of the present disclosure may not necessarily have the advantages, superiorities and effects. In addition, specific details disclosed above are not restrictive but merely exemplary and illustrative for better understanding. The present disclosure is not limited to the above specific details.

Block diagrams of devices, apparatuses, equipment, and systems according to the present disclosure are merely examples, which do not indicate or imply that connections, arrangements and configurations must be in the way shown in the block diagrams. As understood by those skilled in the art, these devices, apparatuses, equipment, and systems may be connected, arranged and configured in any way. Words such as "include", "comprise", "have", and the like are inclusive, which indicate "including but not limited to" and may be used interchangeably. Words "or" and "and" herein refer to "and/or", and may be used interchangeably, unless it is explicitly indicated otherwise by the context. Words "such as" refers to "such as but not limited to", which may be used interchangeably.

Besides, when the word "or" is used between listed elements after the phrase "at least one", it indicates all possible combinations. For example, "at least one of A, B or C" means A or B or C, or AB or AC or BC, or ABC (i.e., A and B and C). Furthermore, expression "example" doesn't mean that the described example is preferable or better than other examples.

It is noted that various units and various steps in the systems and methods of the present disclosure may be decomposed and/or recombined. These decomposition and recombination should be regarded as equivalent technical solutions of the present disclosure.

Variations, replacements and changes may be made to the described technical solutions without departing from the technical scope defined by the attached claims. In addition, the scope of the claims of the present disclosure is not limited to specific details of components, means, methods and actions of the above processes, machines, manufactures and events. One may use components, means, methods and actions of processes, machines, manufactures and events that have similar functions or achieve similar effects as those described above. Therefore, the attached claims cover such components, means, methods and actions of the processes, machines, manufactures and events in the scope.

The above description of the technical solutions of the present disclosure is provided to make those skilled in the art can implement or use the technical solutions. Various modifications on these aspects are apparent for those skilled in the art. General principles defined herein may be applied to other aspects without departing from the scope of the present disclosure. Therefore, the present disclosure is not limited to the aspects described herein, but should comply with the widest scope consistent with the principles and novel features disclosed herein.

The above description is provided for illustration, rather than limiting embodiments of the technical solutions to the disclosed embodiments. Although multiple examples and embodiments are discussed above, those skilled in the art may make some variations, modifications, changes, additions and sub-combinations.

The invention claimed is:

1. An image synthesis method, comprising:
acquiring an identifier for identifying a virtual object;
acquiring a video captured by an image sensor;
recognizing at least one hand in the video and obtaining hand information, wherein the hand information comprises information indicative of at least one key point of the at least one hand;
acquiring image rendering information based on the identifier for identifying the virtual object and the hand information, wherein the image rendering information comprises sequence frames for forming the virtual object and information indicative of an association between the virtual object and the at least one key point of the at least one hand, wherein the image rendering information further comprises a rendering order, wherein the rendering order comprises a first rendering order and a second rendering order, the first rendering order indicates an order of rendering the sequence frames of the virtual object, and the second order indicates an order of rendering the virtual object and the at least one hand;
performing synthesis rendering on the virtual object and the at least one hand based on the image rendering information to generate a synthetic image;
displaying the synthetic image comprising the virtual object and the at least one hand, wherein the virtual object is positioned at the at least one key point of the at least one hand and is movable following a movement of the at least one key point of the at least one hand.

2. The image synthesis method according to claim 1, wherein the acquiring image rendering information based on the identifier for identifying the virtual object and the hand information further comprises:
acquiring the image rendering information from a rendering configuration file by using the identifier for identifying the virtual object and the hand information.

3. The image synthesis method according to claim 1, wherein the image rendering information further comprises one or more of at least one serial number corresponding to the at least one key point of the at least one hand to be followed by the virtual object, a scale of the virtual object, a rendering mode.

4. The image synthesis method according to claim 1, wherein the hand information further comprises information indicating an angle of the at least one hand.

5. The image synthesis method according to claim 4, wherein the acquiring image rendering information based on the identifier for identifying the virtual object and the hand information further comprises:
acquiring rendering angles of the virtual object and the at least one hand, wherein an angle of the virtual object varies with the angle of the at least one hand.

6. The method of claim 1, wherein the image rendering information further comprises information indicative of a scaling level of the virtual object associated with the at least one key point.

7. The method of claim 1, wherein the image rendering information further comprises a rotation parameter indicting whether the virtual object is to be rotated.

8. An image synthesis apparatus, comprising:
at least one processor; and
at least one memory communicatively coupled to the at least one processor and storing instructions that upon execution by the at least one processor cause the apparatus to:
acquire an identifier for identifying a virtual object;
acquire a video captured by an image sensor;
recognize at least one hand in the video and obtain hand information, wherein the hand information comprises information indicative of at least one key point of the hand;
acquire image rendering information based on the identifier for identifying the virtual object and the hand information, wherein the image rendering information comprises sequence frames for forming the virtual object and information indicative of an association between the virtual object and the at least one key point of the at least one hand, wherein the image rendering information further comprises a rendering order, wherein the rendering order comprises a first rendering order and a second rendering order, the first rendering order indicates an order of rendering the sequence frames of the virtual object, and the second order indicates an order of rendering the virtual object and the at least one hand;
perform synthesis rendering on the virtual object and the at least one hand based on the image rendering information to generate a synthetic image; and
display the synthetic image comprising the virtual object and the at least one hand, wherein the virtual object is positioned at the at least one key point of the at least one hand and is movable following a movement of the at least one key point of the at least one hand.

9. The apparatus of claim 8, the at least one memory further storing instructions that upon execution by the at least one processor cause the apparatus to:
acquire the image rendering information from a rendering configuration file by using the identifier for identifying the virtual object and the hand information.

10. The apparatus of claim 8, wherein the image rendering information further comprises one or more of at least one serial number corresponding to the at least one key point of the at least one hand to be followed by the virtual object, a scale of the virtual object, a rendering mode.

11. The apparatus of claim 8, wherein the hand information further comprises information indicating an angle of the at least one hand.

12. The apparatus of claim 8, wherein the image rendering information further comprises information indicative of a scaling level of the virtual object associated with the at least one key point.

13. The apparatus of claim 8, wherein the image rendering information further comprises a rotation parameter indicting whether the virtual object is to be rotated.

14. A non-transitory computer readable storage medium, bearing computer-readable instructions that upon execution on a computing device cause the computing device at least to:
acquire an identifier for identifying a virtual object;
acquire a video captured by an image sensor;
recognize at least one hand in the video and obtaining hand information, wherein the hand information comprises information indicative of at least one key point of the at least one hand;
acquire image rendering information based on the identifier for identifying the virtual object and the hand information, wherein the image rendering information comprises sequence frames for forming the virtual object and information indicative of an association between the virtual object and the at least one key point of the at least one hand, wherein the image rendering information further comprises a rendering order, wherein the rendering order comprises a first rendering order and a second rendering order, the first rendering order indicates an order of rendering the sequence frames of the virtual object, and the second order indicates an order of rendering the virtual object and the at least one hand;

perform synthesis rendering on the virtual object and the at least one hand based on the image rendering information to generate a synthetic image; and display the synthetic image comprising the virtual object and the at least one hand, wherein the virtual object is positioned at the at least one key point of the at least one hand and is movable following a movement of the at least one key point of the at least one hand.

15. The non-transitory computer readable storage medium of claim 14, wherein the image rendering information further comprises information indicative of a scaling level of the virtual object associated with the at least one key point.

* * * * *